(12) United States Patent
Erelt

(10) Patent No.: US 12,546,352 B2
(45) Date of Patent: Feb. 10, 2026

(54) FIRST PART, SUCH AS A FURNITURE PART, COMPRISING A RECESS, A KIT OF PARTS, AND AN ASSEMBLED PRODUCT

(71) Applicant: Inter IKEA Systems B.V., Ln Delft (NL)

(72) Inventor: Catharina Erelt, Växjö (SE)

(73) Assignee: INTER IKEA SYSTEMS B.V. (NL)

( * ) Notice: Subject to any disclaimer, the term of this patent is extended or adjusted under 35 U.S.C. 154(b) by 307 days.

(21) Appl. No.: 18/555,322

(22) PCT Filed: Apr. 13, 2022

(86) PCT No.: PCT/SE2022/050373
§ 371 (c)(1),
(2) Date: Oct. 13, 2023

(87) PCT Pub. No.: WO2022/220734
PCT Pub. Date: Oct. 20, 2022

(65) Prior Publication Data
US 2024/0191738 A1    Jun. 13, 2024

(30) Foreign Application Priority Data
Apr. 16, 2021    (SE) .................... 2150479-0

(51) Int. Cl.
*F16B 12/22*    (2006.01)
*F16B 12/24*    (2006.01)
*F16B 12/10*    (2006.01)

(52) U.S. Cl.
CPC .............. *F16B 12/22* (2013.01); *F16B 12/24* (2013.01); *F16B 2012/103* (2013.01)

(58) Field of Classification Search
CPC .......... F16B 12/00; F16B 12/02; F16B 12/18; F16B 12/009; F16B 12/054; F16B 12/22; F16B 12/24; F16B 12/36
USPC ......................................... 403/348–350, 353
See application file for complete search history.

(56) References Cited

U.S. PATENT DOCUMENTS

| | | | | |
|---|---|---|---|---|
| 4,258,464 | A * | 3/1981 | Ullman, Jr. ............... | B27F 1/00 403/353 |
| 11,530,716 | B2 * | 12/2022 | Bastian .................... | F16B 21/09 |
| 2014/0205373 | A1 | 7/2014 | Andersson et al. | |
| 2018/0328395 | A1 * | 11/2018 | Boone ..................... | F16B 12/22 |

(Continued)

FOREIGN PATENT DOCUMENTS

| | | |
|---|---|---|
| CN | 111742153 A | 10/2020 |
| DE | 102008054055 A1 | 5/2009 |

(Continued)

*Primary Examiner* — Daniel J Wiley
(74) *Attorney, Agent, or Firm* — Dilworth IP, LLC

(57) ABSTRACT

A first part, a kit of parts, and an assembled product, the first part includes two or more recesses being configured to receive a respective associated dowel of a second part, such that the first and second parts become interconnected in order to form an assembled product, such as a furniture, wherein a virtual straight line extending between a respective centre point of a respective insertion portion and a respective centre point of a respective locking portion forms a respective angle relative to an edge of the first part by the centre point of the insertion portion being located at first distance from the edge being larger than a second distance between the centre point of the locking portion and the edge.

20 Claims, 9 Drawing Sheets

(56) References Cited

U.S. PATENT DOCUMENTS

| | | |
|---|---|---|
| 2020/0063776 A1 | 2/2020 | Bastian et al. |
| 2020/0069048 A1 | 3/2020 | Derelov et al. |
| 2020/0370585 A1 | 11/2020 | Huang |

FOREIGN PATENT DOCUMENTS

| | | |
|---|---|---|
| DE | 102018112950 A1 | 12/2019 |
| EP | 2108850 A2 | 10/2009 |
| EP | 3212945 B1 | 12/2018 |
| WO | 2016137385 A1 | 9/2016 |
| WO | 2020027712 A1 | 2/2020 |

\* cited by examiner

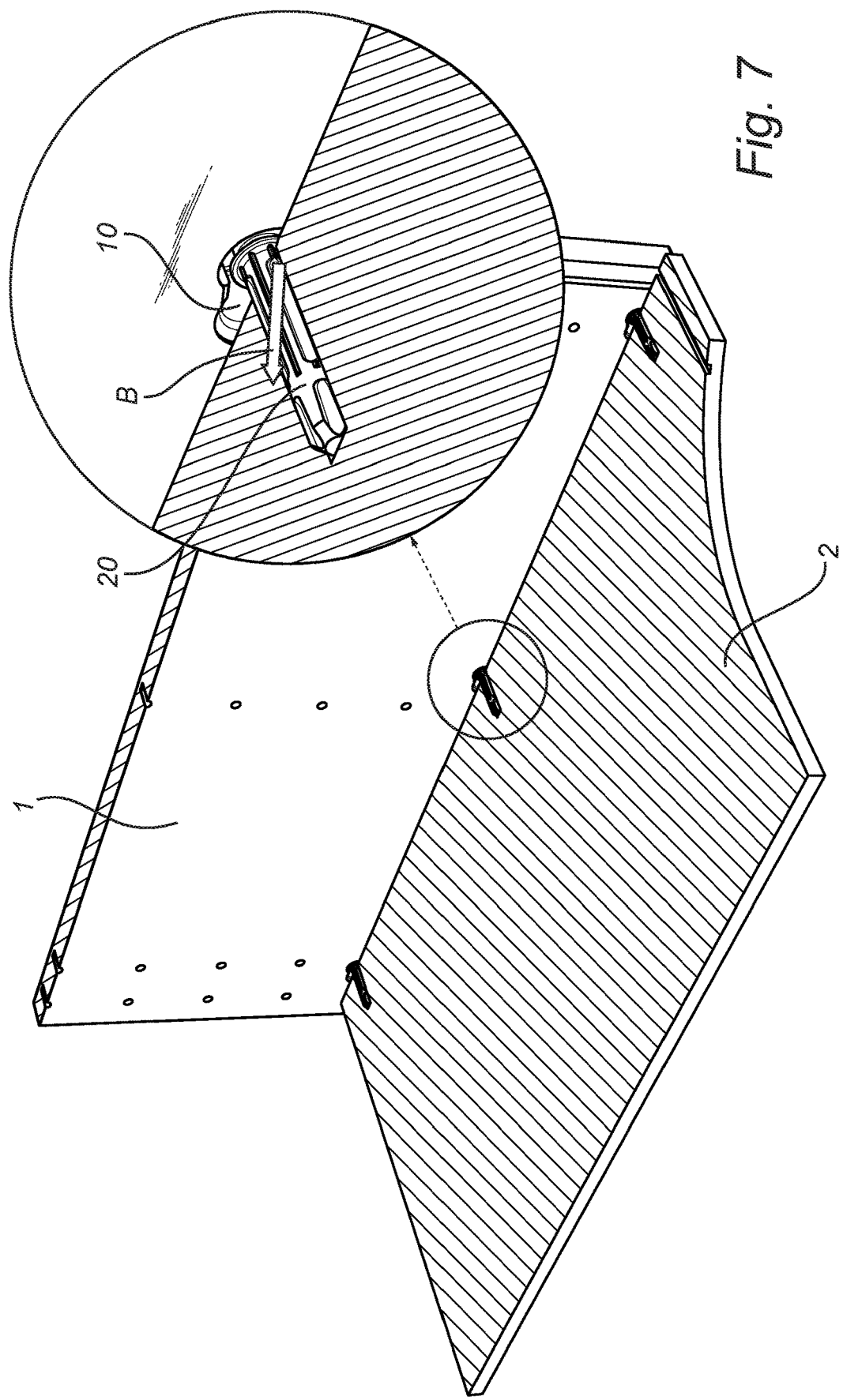

FIRST PART, SUCH AS A FURNITURE PART, COMPRISING A RECESS, A KIT OF PARTS, AND AN ASSEMBLED PRODUCT

FIELD OF INVENTION

The invention relates to a first part comprising at least two recesses being configured to receive a respective associated dowel of a second part, such that the first and second parts become interconnected in order to form an assembled product, such as a furniture.

The invention also relates to a kit of parts for forming an assembled product, such as a furniture, the kit of parts comprising a first part comprising at least two recesses, and a second part having dowels, wherein the respective recess of the first part is configured to receive a respective associated dowel of the second part such that the first and second parts become interconnected in order to form the assembled product.

The invention also relates to an assembled product, such as a furniture, formed of a first part comprising at least two recesses, and a second part having dowels, wherein the first and second parts are interconnected to each other by the respective dowel of the second part being positioned in the respective associated recess of the first part.

TECHNICAL BACKGROUND

In US2014/205373A1 there is disclosed a joint for assemble of two furniture parts to each other. One furniture part has a male part for co-operation with a female part of another furniture part. Each of the male and female parts has a number of grooves. At assembly the male part is moved along the female part by means of co-operation between the grooves of the male and female part, respectively. The co-operating male and female parts have an insertion position and an end position, in which end position the furniture parts are assembled to each other.

This kind of joint has been shown to be easy to assemble while still allowing the furniture to be dissembled. The joint has also been shown to be able to withstand heavy loads.

However, it has been found that under certain circumstances, such as when being subjected to heavy loads, the furniture part being provided with the female part may have a tendency to break first. This is e.g. especially true for hanging cupboards, such as kitchen cupboards, where the female part of the joint is located in an inwardly facing major surface of the vertical side walls of the cupboard and the male part of the joint is located on the end surfaces of the bottom shelf.

In EP 3 212 945 B1 it is stated that when the female part is made as an oblong slot in an inwardly directed flat side of one of the furniture parts and the slot is realized in the proximity of the edge of this furniture part, the material requirements and the positioning of the coupling means can weaken the whole and may lead to the occurrence of a variety of risks. It is further stated that, there is for example the risk that the soft material on the edge of the furniture part may break off. In an attempt to address, it is in EP 3 212 945 B1, suggested that the male part which is situated on a narrow end of one furniture part should be positioned with its centre line between the central plane of the furniture part and the inner side of the furniture part.

However, the authors behind EP 3 212 945 B1 have not realised that the suggested offset of the male part in relation to the height of the bottom shelf, will in fact significantly weaken the bottom shelf as such.

Thus, there still exists a need to address the fact that that under certain circumstances, such as when being subjected to heavy loads, the furniture part being provided with the female part may have a tendency to break first.

It is especially desirous to address this issue for hanging cupboards, such as kitchen cupboards, where the female part of the joint is located in an inwardly facing major surface of the vertical side walls of the cupboard and the male part of the joint is located on the end surfaces of the bottom shelf.

SUMMARY OF INVENTION

It is an object of the invention to provide a technical solution addressing at least some of problems mentioned above. It is e.g. an object of the invention to provide a technical solution to the problem that the furniture part being provided with the female part may have a tendency to break, and especially, but not exclusively, to address this issue in respect of hanging cupboards, such as kitchen cupboards, where the female part of the joint is located in an inwardly facing surface, such as an inwardly facing major surface, of the vertical side walls of the cupboard and the male part of the joint is located on the end surfaces of the bottom shelf.

This object has been achieved by a first part comprising at least two recesses being configured to receive a respective associated dowel of a second part, such that the first and second parts become interconnected in order to form an assembled product, such as a furniture, wherein the two recesses are formed in a first surface of the first part, the first surface being intended to face the second part, and wherein the recesses are positioned, as seen along the first surface, in a vicinity of an edge of the first part, the edge delimiting the first surface, wherein the two recesses are positioned at a repeat distance from each other as seen along the edge, wherein the recesses each has a depth, as seen along a normal to the first surface, and an extension, as seen in a first plane being parallel to the first surface, and includes an insertion portion and a locking portion arranged one after the other along the extension of the recess, wherein the respective dowel of the second part is adapted to be inserted into the respective insertion portion by relatively moving the second part towards the first surface, and then to be transferred from the respective insertion portion to the respective locking portion by relatively moving the second part along the extension of the respective recess, and wherein a respective virtual straight line extending between a centre point of the respective insertion portion and a centre point of the respective locking portion forms a respective angle relative to the edge of the first part as seen in the first plane by the centre point of the respective insertion portion being located at a respective first distance from the edge and the centre point of the respective locking portion being located at a respective second distance from the edge with the respective first distance being larger than the respective second distance.

It has surprisingly been found that although the dowel rests in the locking portion of the recess and the forces originating from the load on the second part thereby are transmitted from the dowel to the inside walls of the locking portion, the risk of breaking off the edge is significantly reduced if the recess is angled an angle such that the insertion portion is moved away from the edge. Compared to prior art this offers a significant improvement since there is provided a reduction of the risk of breaking off the edge of the first part without there being introduced a need for a change of the design of the second part. There is e.g., no longer a need to position the dowel offset relative to the material thickness of the second part, which is suggested by the prior art and which unfortunately weakens the second part. Thus, it is preferred that the dowel is centrally positioned on the end surface of the second part. This may also be expressed as that the centre axis of the dowel is positioned at equal distances from the two major surfaces of the second part.

It has been found that stresses originating from the contact between the dowel and the locking portion are transmitted in the material and have a tendency to be restricted and concentrated at the surface and especially in the constriction in a sense formed between the insertion portion and the edge. It has been found that there is provided a significant improvement already for really small angles.

As mentioned above, this kind of joint has been shown to be easy to assemble while still allowing the furniture to be dissembled. The joint has also been shown to be able to withstand heavy loads. With the design as specified above and further specified below, there has thus also been addressed the problem associated with the prior art designs; namely that when subjected to heavy load, the first part being provided with the recess may have a tendency to break first, and especially so for those cases where the recess is positioned in the vicinity of an edge. Thus, the first part is especially useful for assembly of hanging cupboards, such as kitchen cupboards, where the recess forming the female part of the joint is located in an inwardly facing major surface of a first part forming a vertical side wall of the cupboard and the dowel forming the male part of the joint is located on an end surface of a second part forming a bottom shelf of the cupboard.

It may be noted that the first furniture part may be provided with additional recesses not being associated with any dowel of the second part. This may e.g. be the case if the first part is manufactured in great numbers and is adapted to be used in more than one use scenario or more than one kind of assembled product. Such different use scenarios or different assembled products may involve such a first part being connected to different second parts in the different scenarios or product. The second parts may be completely different, but in this regard, it is sufficient that they are different at least in the sense that the number and/or positions of the dowels are different on the different second parts. It may also be that one and the same second part may be interconnected to the first part in two different positions and/or orientations and that one or more recesses are not associated with a dowel in one or more of those positions and/or orientations of the second part.

The first surface may e.g., be a first major surface of the first part. In the preferred embodiment, the first surface is a first major surface of the first part facing a corresponding first surface formed of a first major surface of an oppositely arranged second instance of a first part. The second instance of the first part may be an identical copy or, as typically is the case, it may be a mirrored copy; mirrored in an intermediate imaginary plane arranged between the two instances of the first part and being parallel to the first major surfaces.

It may be noted that the inventive joint is especially useful when the recess is positioned, as seen along the first surface, in a vicinity of an edge of the first part, the edge delimiting the first surface, since such a positioning of the recess may in the prior art designs result in that the material forming the edge breaks off. However, it may also be noted that there is nothing that prevents the inventive design of the joint to be used also for cases where the recess is positioned at a significant distance from the edge. The phrase "in the vicinity" refers primarily to those cases where the recess is positioned so close to the edge that one has to take into account that the first part is weaker when the load is directed along the first surface and towards the edge compared to when the load is directed along the first surface and away from the edge. For instance, in the case of the assembled product being a cupboard having side walls formed of such first parts and a bottom surface formed of such a second part extending between the inwardly facing major surfaces of the two first parts, the second part typically have its bottom major surface essentially flush with the edges and the second part is typically so thin that the recess associated with the dowels becomes located so close to the edge that the first part is weaker against loads towards the edge compared to loads directed away from the edge; i.e. such a recess is considered to be in the vicinity of the edge. However, if the joint is used for a central shelf being located e.g., 20 centimetres upwardly from the bottom edge, there is no practical difference in the strength of the first part for the case when it is being subjected to a load directed towards the bottom edge compared to the case when it is being subjected to a load directed away from the bottom edge. Thus, such a recess is not considered to be in the vicinity of the edge. In the vicinity may e.g., be defined as a distance between the edge and the recess, with the distance being measured along a direction being transverse to the extension of the edge. The recess may e.g., be considered to be in the vicinity of the edge if the distance e.g., is less than three times a width of the insertion portion as measured in the same direction as said distance. Alternatively, or as a complementary notion, the recess may e.g., be considered to be in the vicinity of the edge if the distance e.g., is less than three times the depth of the recess.

In this context it may also be noted that the edge does not necessarily need to be a straight line. The edge may be shaped differently; it may e.g. be shaped as an undulating wave, as a single concave or convex curve with constant or varying radius of curvature, as a step-function, as a zig-zag-design. However, in the preferred embodiment, the edge is shaped as a straight line. In this context it may also be noted that the edge has in one direction a linear extension, typically a rectilinear extension but as mentioned above conceivably also along a line having any other shape, delimiting the first surface and in another direction an extension extending typically parallel to, or conceivably at least with a main component along, the normal N to the first surface, such that the edge essentially forms an end surface of the first part. It may in this context be noted that the end surface typically extends along the complete material thickness of the first part and thereby forms an end surface extending across the complete material thickness. However, the inventive joint may conceivably also be useful if the first part has a stepped end surface with an edge delimiting the first surface where the edge extends only through part of the material thickness of the first part. The inventive joint may be useful basically for all cases where the recess is formed in a first surface and is positioned in the vicinity of an edge delimiting the first surface. It may in this context also be noted that although the extension of the edge, as seen along the normal of the first surface, is typically a planar surface parallel to the normal, the extension along the direction of the normal may have other shapes, such as the ones referred to above with reference to the linear extension along the edge.

In practice the recesses will preferably be designed such that the respective recess also physically extends along the virtual straight line extending between a centre point of the insertion portion and a centre point of the locking portion. The virtual straight line extends in the first plane.

It may be mentioned that the centre point of the locking portion typically is a position through which a centre axis of the dowel extends when the first and second parts are in the interlocked or interconnected position.

The first distance by which the centre point of the insertion portion is separated from the edge and second distance by which the centre point of the locking portion is separated from the edge are typically the respective closest distances as seen in the first plane. For an elongated straight line edge these shortest distances will be measured rectilinearly to the extension of the edge.

The first part comprises at least two recesses formed in the first surface of the first part. The two or more recesses are positioned at a repeat distance from each other as seen along the edge. The two recesses may both be angled the same angle with respect to the edge. This latter concerning the same angle with respect to the edge may also apply in case there are three or more recesses along the edge. The provision of two recesses configured to receive two associated dowels of the second part increases the strength of the assembled product. The provision of three or more recesses configured to receive associated dowels of the second part further increases the strength of the assembled product. If the two recesses. or more recess if present, also are angled the same angle, it is facilitated to move the second part along a translational movement allowing the dowels of the second part to simultaneously move from the insertion portion to the locking portion of the respective recess.

It may be noted that the two or more recesses preferably are identical to each other, but that it is conceivable that they are slightly different from each other. However, if there are two or more recesses it is at least preferred that the second recess, and possibly further recesses, is/are of the same general kind as the first recess in the sense that also the second recess, and possibly further recesses, is/are defined by corresponding features as the features used to define the first recess, albeit possibly with different numerical values in respect of the different features.

It may be noted that in case there are three or more recesses according to one embodiment the same repeat distance is used for all the recesses, whereas according to another embodiment one repeat distance is used between at least a first set of two neighbouring recesses and another repeat distance is used between at least a second set of two neighbouring recesses, wherein the sets of neighbouring recesses may but need not share a common recess.

Different repeat distances between different sets of neighbouring recesses may be used for a number of different reasons; considered alone or in combination with each other. Different repeat distances may e.g., be used to secure that the parts may only be connected to each other in a specific orientation. It may be used in a less restrictive manner and thereby to facilitate that the parts are connected to each other in an intended orientation. It may also be used to take into consideration expected uneven distribution of loads. The differences in repeat length may be significant and clearly visible but may alternatively be small and barely noticeable. Significant and clearly visible differences are typically used for the reasons mentioned above. Small and barely noticeable differences might e.g., be used to control which set or sets of dowel and recess will fully reach an end position and thereby determine the position of the second part relative to first part when the first and second parts are interconnected.

The respective centre point of the respective insertion portion of the two or more recesses are preferably both located the same first distance from the edge. Thereby it is facilitated to provide a design where the edge is equally strong at the respective recess which typically makes the most of the available strength of the material.

The respective centre point of the respective locking portion of the two or more recesses are preferably both located at the same second distance from the edge. This facilitates designing the assembled product.

The angle is preferably at least 5°, more preferably between 5-40°, yet more preferably between 5-30°. As mentioned above, there is provided a significant improvement already for small angles. However, in order to provide a really significant effect the angle is preferably at least 5°. On the other hand, if the angle becomes too large, it may become counter-intuitive concerning the direction by which the second part should be moved relative to the first part in order to move the dowel from the insertion portion to the locking portion. A large angle may also make it more difficult to design the assembled product such that the recess is hidden by the second part. This latter is not necessary, but it is often desirous to hide the recess since it reduces the risk that the skin of a finger gets caught, it secures that there is no dust trap formed, and it is often desirous from an aesthetical perspective. Thus, the angle is preferably at least 5°, more preferably between 5-40°, yet more preferably between 5-30°.

The first part is preferably designed such that, along the depth of the respective recess,
  the insertion portion has a width, as measured across the extension of the recess, and
  the locking portion has
    at least one first portion having a first width, as measured across the extension of the recess, and being located at a first depth, and
    at least one second portion having a second width, as measured across the extension of the recess, and being located at a second depth, the second depth being deeper than the first depth, and the second width being larger than the first width,
  wherein the first width of the first portion of the locking portion is smaller than the width of the insertion portion.

This may alternatively or complementary be referred to as that the first part is preferably designed such that there is a comparably wide portion down at the bottom of locking portion of the recess beneath a comparably narrower portion located at or at least closer to the surface. It may be noted that such a set of such a first portion and such a second portion may be repeated more than ones. In the preferred embodiment there is only one such set of first portion and second portion. If there are a plurality of such sets of first and second portions, the locking portion may be said to be provided with a plurality of grooves and protrusions as seen along the direction of the depth. Such a design may e.g., be of the kind disclosed in US2014/205373A1; see e.g., FIGS. 4-11.

With such a design, a correspondingly shaped dowel may be inserted into the insertion portion of the recess and may then be slid along the extension of the recess such that a wider portion of the dowel becomes nested beneath the narrower portion of the locking portion.

Preferably, the second width of the second portion of the locking portion is about equal to the width of the insertion portion. In this context about is considered to refer to a design where the difference is less than 10%. In a preferred embodiment, the second width of the second portion of the locking portion is nominally equal to the width of the insertion portion. It is conceivable that the width of the insertion portion is slightly larger than the second width of the second portion of the locking portion such that insertion of the dowel is facilitated, and a strong locking effect is provided when the dowel is in the locking portion. This may e.g., be within the 10% difference referred to above.

The respective recess may be angled an angle at least such that a shortest distance between the insertion portion and the edge is equal to a shortest distance between the first portion of the locking portion and the edge.

The first part may have a material thickness at the respective recess as measured along the normal to the first surface, and the recess may have a depth being between 25% and 90% of the material thickness of the first part at the recess.

This may alternatively be referred to as that the remaining material thickness between the bottom of the recess and the second major surface, opposing the first major surface, is between 75% and 10% of the material thickness of the first part at the areas surrounding the recess. This is considered to make it possible to strike a balance between providing a strong structure with a design of the recess and dowel such that it is capable of withstanding that the dowel is pulled out of the recess along the direction of the normal and such that it reduces the risk that the edge breaks off.

The above mentioned object has also been achieved by a kit of parts for forming an assembled product, such as a furniture, the kit of parts comprising:
  a first part, and
  a second part having dowels extending from a surface of the second part along a dowel direction towards a free end of the respective dowel,
  wherein the respective recess of the first part is configured to receive the respective associated dowel of the second part such that the first and second parts become interconnected in order to form the assembled product.

Advantages of most of these features has been discussed in detail with reference to the first part and reference is made to that discussion, since the advantages are equally applicable to this kit of parts.

The first part may be a first panel shaped element. The first surface, in which the recess is formed, is preferably a major surface of the first panel shaped element.

The second part may be a second panel shaped element. The surface, from which the dowel extends, is preferably an end surface of the second panel shaped element.

Preferably, the second part has at the respective dowel a material thickness as measured along a first transverse direction being transverse to the dowel direction and an extension in a second transverse direction being transverse to the dowel direction and to the first transverse direction, and wherein the recess is angled an angle at the most such that the surface, which has an extension defined by the material thickness in the first transverse direction and by the extension of the second part in the second transverse direction, fully covers the recess including fully covering a mouth of the insertion portion when the first and second parts are interconnected to form the assembled product.

It may be noted that by angling the recess an angle at the most such that the surface, which has an extension defined by the material thickness in the first transverse direction and by the extension of the second part in the second transverse direction, fully covers the recess including fully covering a mouth of the insertion portion when the first and second parts are interconnected to form the assembled product, there is provided a design where the recess is not visible when the first and second parts are interconnected.

Preferably, the extension of the second part in the second transverse direction being transverse to the dowel direction and to the first transverse direction is larger than the material thickness of the second part. This is preferably true at least in one direction from the respective dowel along the second transverse direction. In the preferred embodiment this extension is larger than the material thickness in both directions from the respective dowel along the second transverse direction. However, it is conceivable that one or both dowels at the respective end as seen along the second transverse direction is located so close to the end that the extension between that dowel and the end is smaller than the material thickness. However, in that case, the extension from that dowel is still preferably larger than the material thickness in the direction along the second transverse direction towards the neighbouring dowel.

Preferably, the first part is configured to form a structural side wall of the assembled product, the structural side wall extending along a side wall direction having a main component along a vertical direction, and
  the second part is configured to form a structural shelf of the assembled product, the structural shelf extending along a shelf direction having a main component along a horizontal direction.

Preferably, the structural side wall extending along a side wall direction extends along a vertical direction. Preferably, the structural shelf extending along a shelf direction extends along a horizontal direction.

Preferably, the second part is configured to form a structural bottom of the assembled product.

Preferably, the first and second parts are designed such that, when the first and second parts are interconnected with each other, a virtual planar extension of an outwardly facing major surface of the second part is located in flush with the edge of the first part or is positioned at a distance extending inwardly along the first surface from the edge, the distance being less than material thickness of the second part, preferably less than half the material thickness of the second part.

Preferably, the first and second parts are designed such that the first part has a material thickness at the recess as measured along the normal to the first surface, and the material thickness of the first part is within 50% to 200%, preferably within 80% to 120%, of the material thickness of the second part.

The above mentioned object has also been achieved by an assembled product, such as a furniture, formed of
  a first part, and
  a second part having dowels extending from a surface of the second part along a dowel direction towards a free end of the respective dowel,
  wherein the first and second parts are interconnected to each other by the respective dowel of the second part being positioned in the respective associated recess of the first part.

Preferably, the second part has at the dowel a material thickness as measured along a first transverse direction being transverse to the dowel direction and an extension in a second transverse direction being transverse to the dowel direction and to the first transverse direction, and
  wherein the respective recess is angled an angle at the most such that the surface, which has an extension defined by the material thickness in the first transverse direction and by the extension of the second part in the second transverse direction, fully covers the recess including fully covering a mouth of the insertion portion when the first and second parts are interconnected and form the assembled product.

Advantages of these features has been discussed in detail with reference to the first part and with reference to the kit of parts and reference is made to those discussions, since the advantages are equally applicable to this assembled product.

It may be noted that the use of first, second, third, fourth, fifth, etc. are mainly to be seen as labels facilitating reading and that it does not necessarily mean that there need to be all the intervening numbers of entities present. However, to facilitate reading, we have consistently used the numbering first, second, third, fourth, etc., as labels, and in a sense based on an embodiment including all conceivable entities.

It may also be noted that names such as top, bottom and wall are intended meant to be read as labels, not necessarily defining the orientation of the assembled product. As an example, the assembled product does not necessarily need to be oriented as shown in the drawings. The assembled product may be oriented such that the first part may form a top or bottom, and the second part may form a side wall. However, in the preferred embodiments, the first part is intended to form a side wall and the second part is intended to form a shelf, typically a bottom shelf.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

The invention may also in short be said to relate to a first part, a kit of parts, and an assembled product, wherein the first part comprises a recess being configured to receive an associated dowel of a second part, such that the first and second parts become interconnected in order to form an assembled product, such as a furniture, wherein a virtual straight line extending between a centre point of an insertion portion and a centre point of a locking portion forms an angle relative to an edge of the first part by the centre point of the insertion portion being located at first distance from the edge being larger than a second distance between the centre point of the locking portion and the edge. Thus, it is contemplated that for certain applications, it is conceivable that there is only one recess in the first part. Such a single recess may be designed in accordance with any of the preferred embodiments discussed above and in the detailed description where the different features have been disclosed in the context of a first part having two or more recesses. Thus, features associated with respective recess in the context of the first part having two or more recesses are equally applicable to a design of the first part having only a single recess.

BRIEF DESCRIPTION OF THE DRAWINGS

The invention will by way of example be described in more detail with reference to the appended schematic drawings, which shows a presently preferred embodiment of the invention.

FIG. 3b is an enlargement of a recess shown in FIG. 3a.

FIG. 4 is a plan view of a first part according to one embodiment thereof and.

FIG. 7 is a view corresponding to the view of FIG. 2 showing the first and second part in an intermediate position.

DETAILED DESCRIPTION OF PREFERRED EMBODIMENTS

Figure 1:
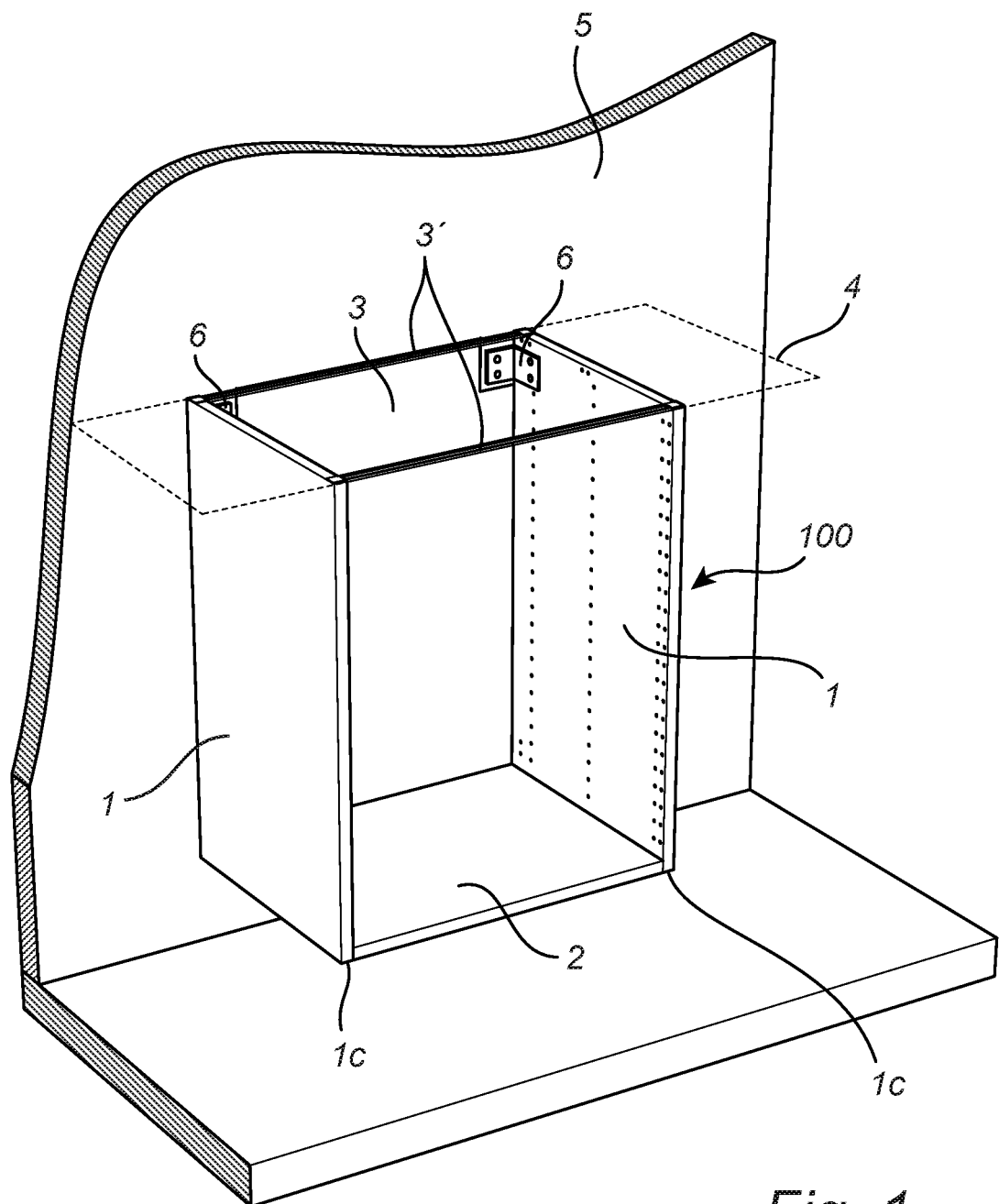
FIG. 1 discloses an assembled product exemplified as a hanging cupboard with an open top, such as a hanging kitchen cupboard which e.g., may be installed underneath a countertop.

FIG. 1 discloses an assembled product 100 exemplified as a hanging cupboard 100 with an open top 3. Such a cupboard 100 may e.g., be used as a hanging kitchen cupboard 100 which e.g., may be installed underneath a countertop 4, the countertop 4 being indicated by dashed lines. The assembled product 100 comprises as main components two oppositely arranged side walls 1, a bottom shelf 2, and two connectors 3'. The bottom shelf 2 extends between and is connected to the two side walls 1 at the bottom of the cupboard 100. The two connectors 3' extends between and are each connected to the two side walls 1 at the top of the cupboard 100. In a sense it may be said that the two connectors 3' takes the role of a top panel 3 of the kind disclosed in FIG. 2. The cupboard 100 is attached to a wall 5. In this FIG. 1, the attachment is exemplified by the provision of brackets 6 which on one hand are attached to the side walls 1 of the cupboard 100 and on the other hand are attached to the wall 5. The brackets 6 may e.g., be screwed to the side walls 1 and to the wall 5.

Figure 2:
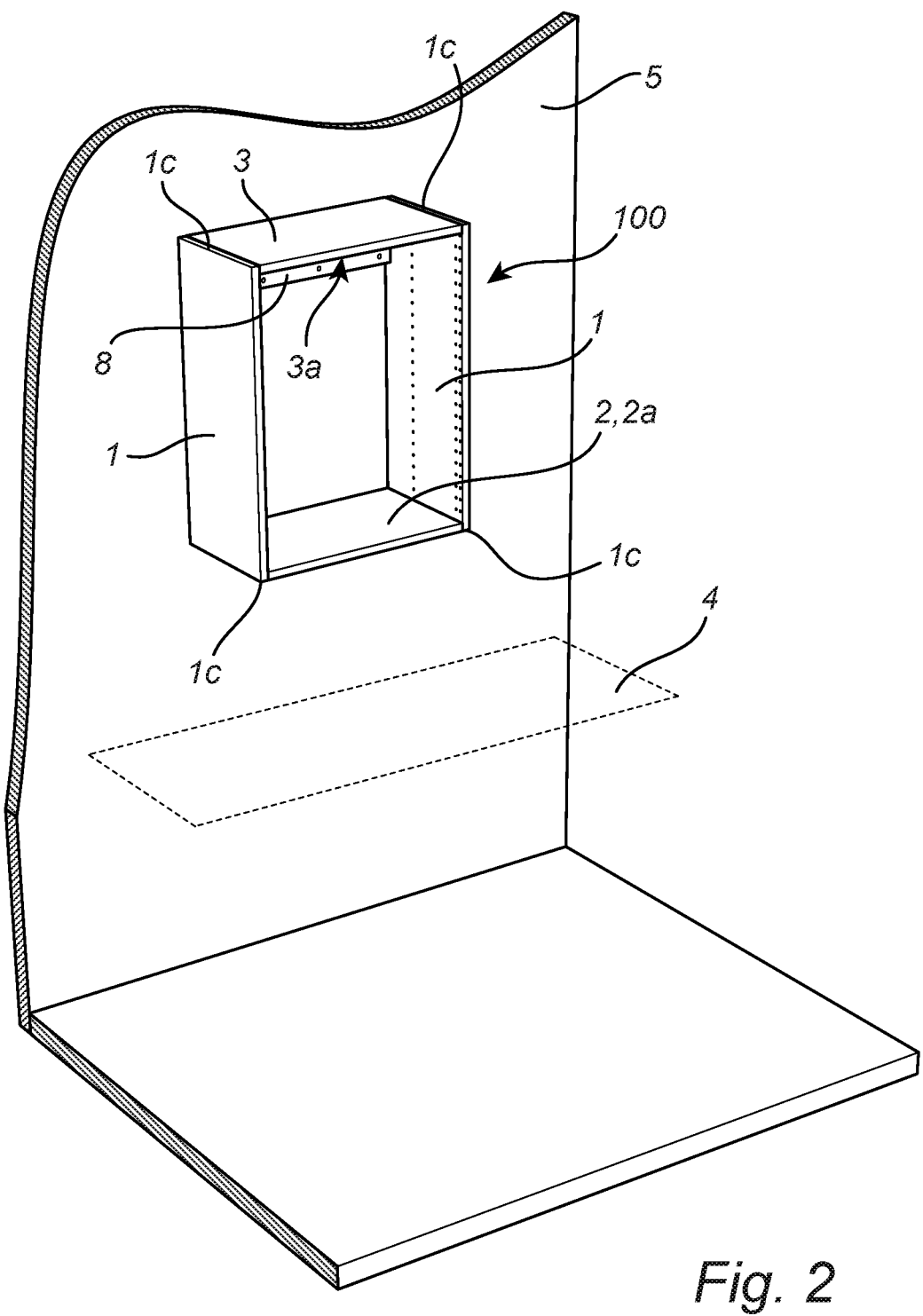
FIG. 2 discloses an assembled product exemplified as a hanging cupboard, such as a kitchen cupboard which e.g., may be installed on a wall above and at a distance from a countertop.

FIG. 2 discloses an assembled product 100 exemplified as a hanging cupboard 100 with a top panel 3. Such a cupboard 100 may e.g., be used as a hanging kitchen cupboard 100 which e.g., may be installed on a wall 5 above and at a distance from a countertop 4, the countertop 4 being indicated by dashed lines. The assembled product comprises as main components two oppositely arranged side walls 1, a bottom shelf 2, and a top or top shelf 3. The bottom shelf 2 extends between and is connected to the two side walls 1 at the bottom of the cupboard 100. The top or top shelf 3 extends between and is connected to the two side walls 1 at the top of the cupboard 100. The cupboard 100 is attached to a wall 5. In this figure, the attachment is exemplified by the provision of a board 8 which is attached to the wall 5 and which extends a short distance from the wall 5. The inside surface 3a rests against the upper edge of this board 8 and thereby the cupboard 100 hangs on the wall 5.

It may be noted that the suspension system used to hang the cupboard 100 on the wall 5 may basically be of any conventional kind. A person skilled in the art is well-aware of numerous other systems than the ones indicated above. As will be apparent from the description below, the inventive connection is useful for hanging cupboards 100 irrespective of the specific choice suspension system used to hang the cupboard 100 on the wall 5. However, it may be noted that the specific choice of suspension system may have an impact on whether the inventive connection provides a significant improvement only at the bottom shelf 2 or if the inventive connection provides a significant improvement also at the top shelf 3.

With the suspension system shown in FIG. 1, the invention disclosed herein is especially useful for the connection between the side walls 1 and the bottom shelf 2. When a load is positioned on the bottom shelf 2, the load is transferred to the side walls 1 close to the edge 1c at the bottom of the respective side wall 1 and then via the sidewalls 1 and the brackets 6 to the wall 5. With the suspension system shown in FIG. 2, the invention disclosed herein is especially useful for both the connection between the side walls 1 and the bottom shelf 2 and for the connection between the side walls 1 and the top shelf 3. When a load is positioned on the bottom shelf 2, the load is transferred to the side walls 1 close to the edge 1c at the bottom of the respective side wall 1 and then via the sidewalls 1 to the top panel 3 and then via the board 8 to the wall 5. It may be noted that since the top panel 3 is connected to the sidewalls 1 close to the edge 1c at the top of the respective sidewall 1 and due to the suspension system with the board 8 acting on the inside surface 3a of the top panel 3, the load conditions at the edge 1c at the top will basically be identical to the load conditions at the edge 1c at the bottom as seen relative to the respective edge 1c.

In the following the details will be discussed with reference to a connection at a lower left corner between a sidewall 1 and a bottom shelf 2. However, as has been discussed above, the inventive connection may be useful also for other connections. Typically, it will be used at the connection between the bottom shelf 2 and the left sidewall 1 as well as at the connection between the bottom shelf 2 and the right sidewall 1. As has already been mentioned, the inventive connection may also be used at the connections between the top shelf 3 and the left sidewall 1 as well as at the connection between the top shelf 3 and the right sidewall 1. It may in this context also be noted the inventive connection may also be useful for interconnecting parts with other orientations than the ones shown in FIGS. 1 and 2. It is e.g. conceivable that different directions of the expected loads may be such that it is considered more useful to have the assembled product rotated, such as rotated 90 degrees such that the parts named sidewalls in FIGS. 1 and 2 forms a bottom shelf and a top shelf, and with the parts named bottom shelf and top shelf in FIGS. 1 and 2 extending therebetween as sidewalls. It is e.g., also conceivable that the assembled product 100 is formed of one or more parts that at one side thereof are connected with its short edge towards a major surface of a second part close to an edge of that second part whereas the first part at the other side thereof receives at its major surface and close to its edge a short edge of a third part. That is, such a part has at one side thereof a connection as shown in FIGS. 1 and 2 and at the other side thereof a connection as if the assembled product 100 would have been rotated 90 degrees. For the bottom shelf 2 this would e.g., be that the connection at the left side would be as shown in FIGS. 1 and 2, whereas the connection at the right side would be formed by the bottom shelf extending beneath the sidewall to the right and that the sidewall rests with its bottom edge on the upper major surface of the bottom shelf.

In view of the fact that the inventive connection may be used in a number of different scenarios and orientations, we will in the following refer to the different parts as a first part 1 and a second part 2. In the context of the cupboards 100 shown in FIGS. 1 and 2, the first part 1 will be any of the sidewalls 1 and the second part 2 may e.g., be the bottom shelf 2. As mentioned above, the following figures shows the lower left corner.

Figure 3A:
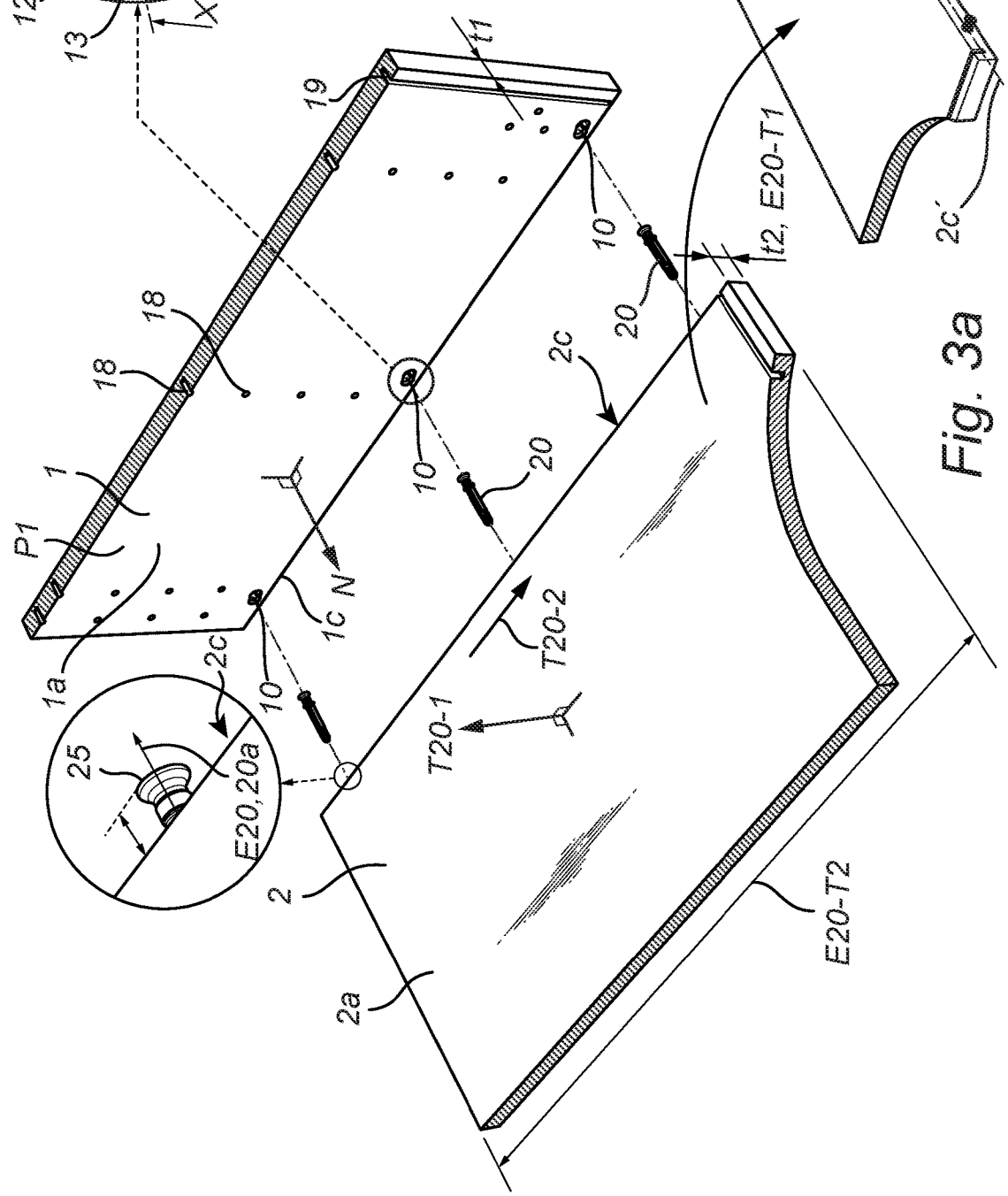
FIG. 3a is an exploded view of a corner connection between first and a second part of an assembled product, such as a lower left corner connection of an assembled product of the kind disclosed in FIGS. 1 and 2.
Figure 3B:
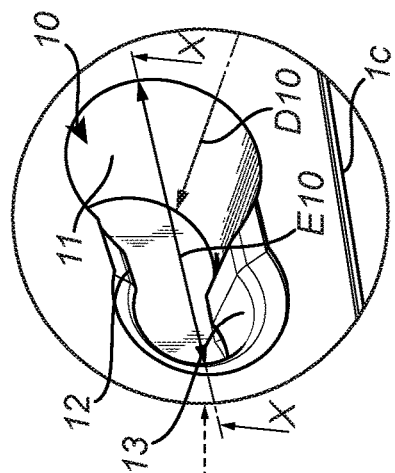

As shown e.g., in FIG. 3a, the connection is formed by a first part 1 comprising a recess 10 and a second part 2 comprising a dowel 20. The respective recess 10 is configured to receive an associated dowel 20. In the embodiment shown in FIG. 3a, there are three sets with each set including a recess 10 and an associated dowel 20. In this preferred embodiment, the three recesses 10 are identical to each other and the three dowels 20 are identical to each other. However, it is conceivable that a first set of a first recess and an associated first dowel is different from a second set of a second recess and an associated second dowel. It may also be noted that the number of sets of a recess 10 and an associated dowel 20 may vary from anything to one to any integer. However, it is preferred that at respective connection between a first part 1 and a second part 2 there is at least two sets of a recess 10 and an associated dowel 20, i.e., at least two recesses 10 and two dowels 20.

In the following, the design of the recess 10 and the dowel 20 will be discussed in detail with reference to a generic representation of any such set of a recess 10 and a dowel 20.

The recess 10 is formed in a first surface 1a of the first part 1. The first surface 1a is intended to face the second part 2. The recess 10 is positioned, as seen along the first surface 1a, in a vicinity of an edge 1c of the first part 1. The edge 1c delimits the first surface 1a.

The recess 10 has a depth D10, as seen along a normal N to the first surface 1a. The recess 10 has an extension E10, as seen in a first plane P1 being parallel to the first surface 1a.

Figure 8A:
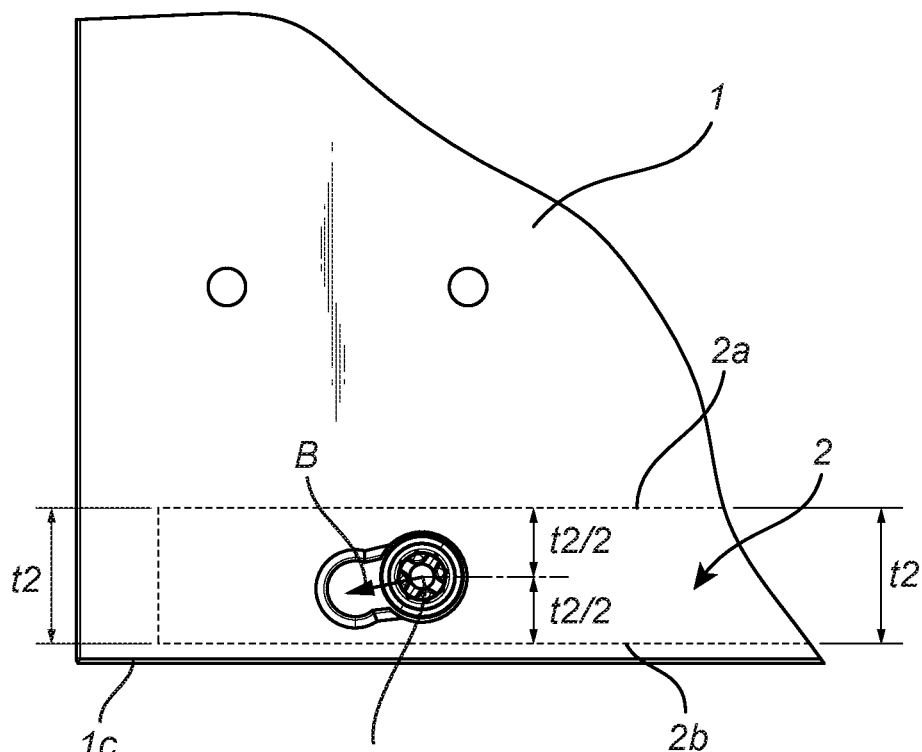
FIGS. 8a and 8b discloses how a first part and a second part of an assembled product are interconnected to each other.

The recess 10 includes an insertion portion 11 and a locking portion 13 arranged one after the other along the extension E10 of the recess 10. The dowel 20 of the second part 2 is adapted to be inserted into the insertion portion 11 by relatively moving the second part 2 towards the first major surface 1a, as indicated by arrow A in FIG. 3a. This intermediate position is shown in FIG. 7 and in FIG. 8a. Thereafter, the dowel 20 is transferred from the insertion portion 11 to the locking portion 13 by relatively moving the second part 2 along the extension E10 of the recess 10 as indicated by arrow B in FIGS. 7 and 8a.

The recess 10 may also include a waist portion 12 between the insertion portion 11 and the locking portion 13. The waist portion 12 have a width as measured transverse to the extension E10 being related to the size of the dowel 20 such that the user needs to apply a slightly increased force to make the dowel 20 pass the waist portion 12 when the dowel 20 is moved from the insertion portion 11 to the locking portion 13. The passage past such a waist portion 12 may be perceived as a tactile and/or audible feedback to the user concerning that the dowel 20 has been positioned into the locking portion 13. Such a waist portion 12 may also aid in keeping the dowel 20 in the locking portion 13.

Figure 4:
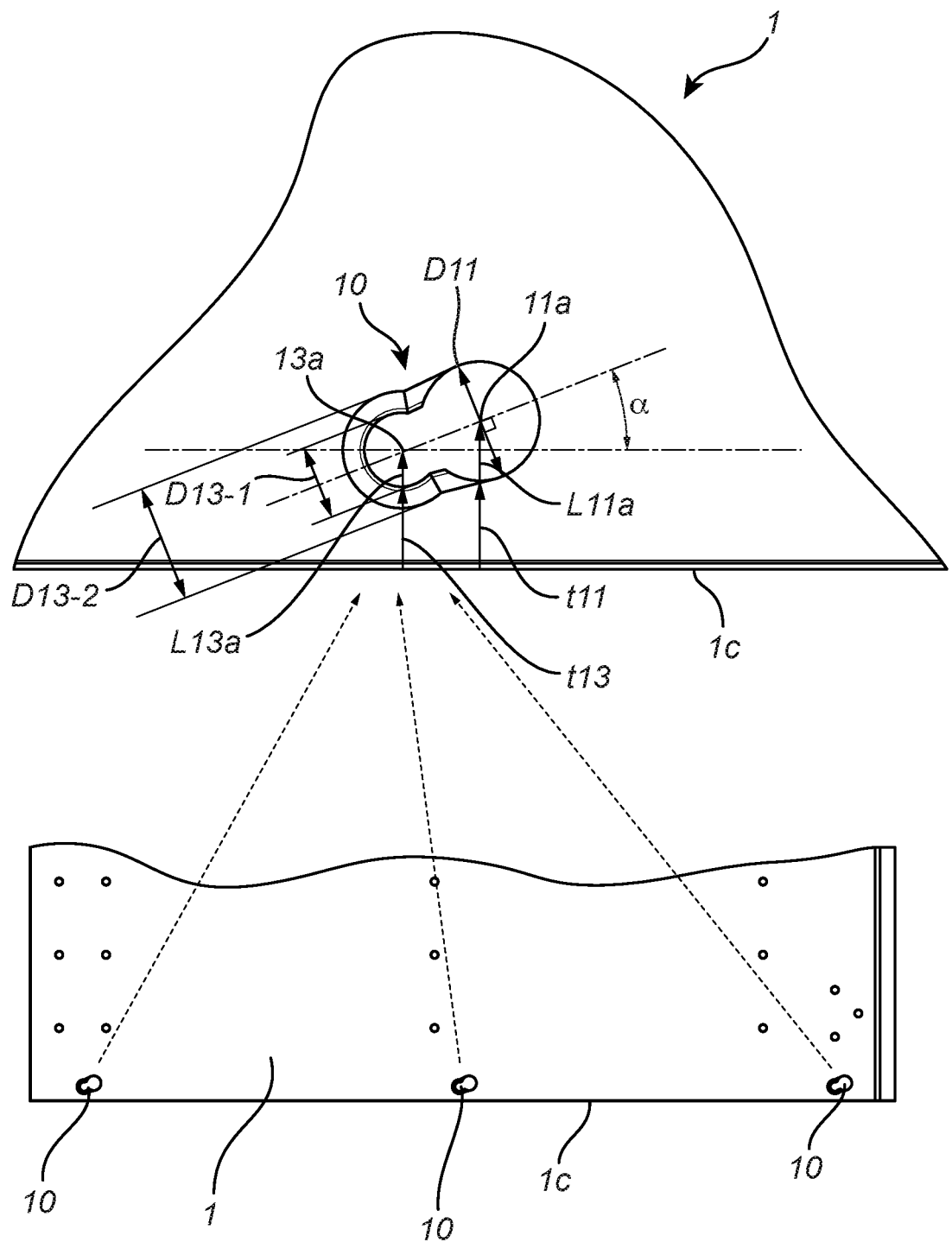
Figure 5:
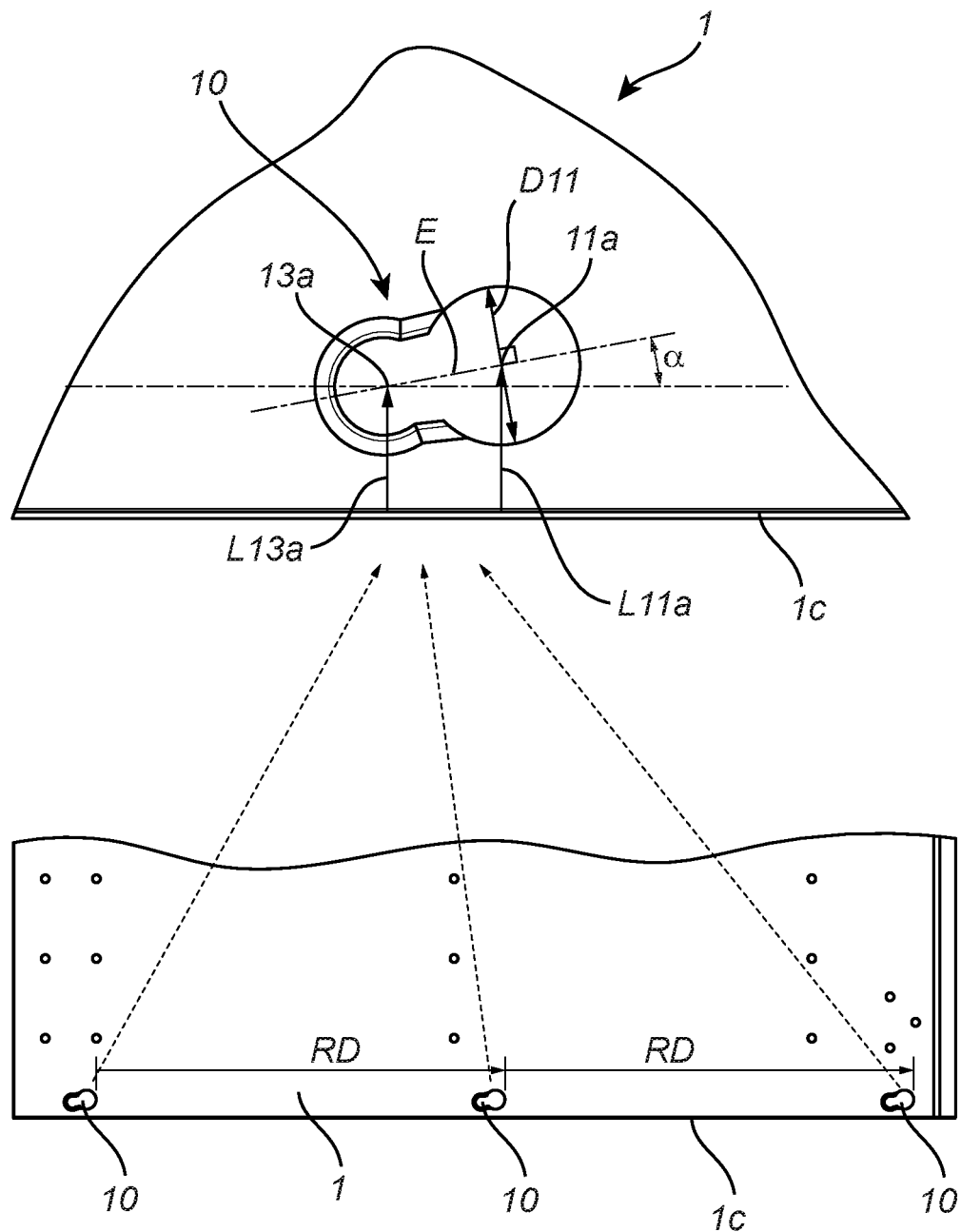
FIG. 5 is a detail of a plan view of a first part according to a variation of the embodiment of FIG. 4.
Figure 6:
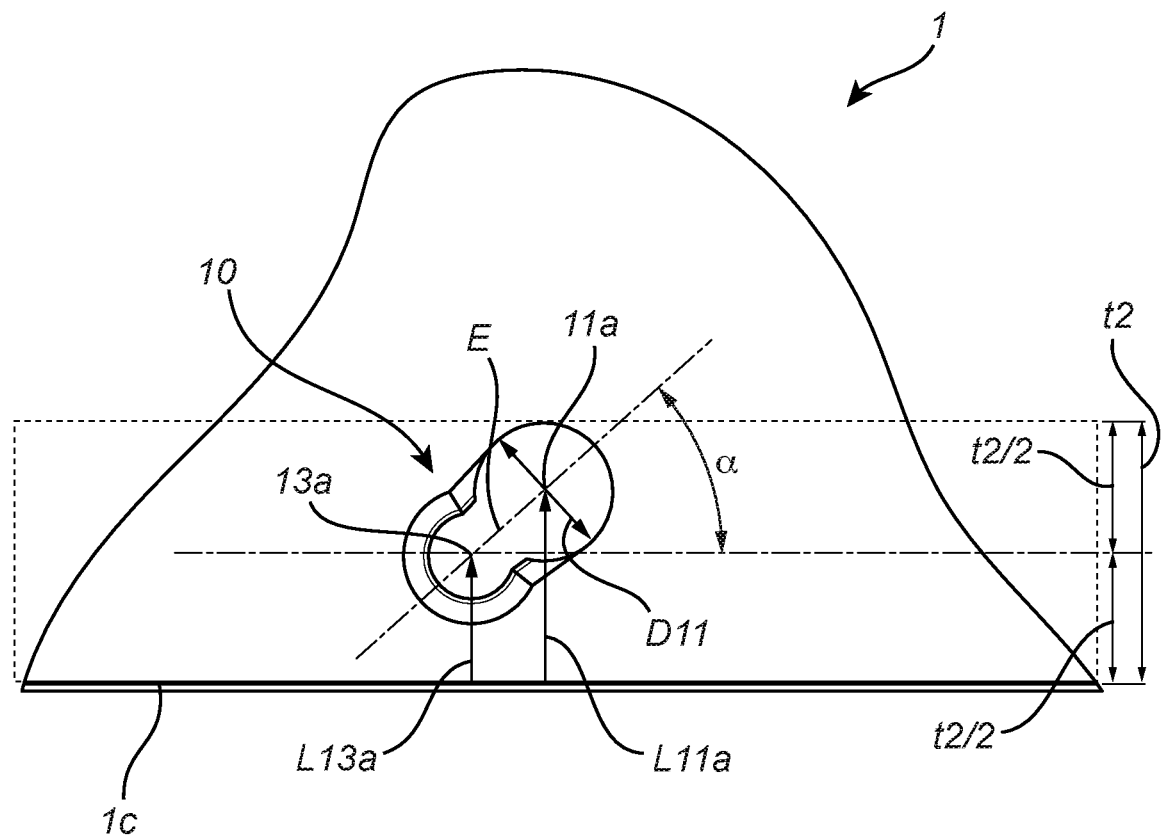
FIG. 6 is a detail of a plan view of a first part according to another variation of the embodiment of FIG. 4.

As is best shown in FIGS. 4-6, a virtual straight line E extending between a centre point 11a of the insertion portion 11 and a centre point 13a of the locking portion 13 forms an angle α relative to the edge 1c of the first part 1 as seen in the first plane P1.

As shown e.g., in FIGS. 4-6, the recess 10 is angled such that the centre point 11a of the insertion portion 11 is located at first distance L11a from the edge 1c and the centre point 13a of the locking portion 13 being located at a second distance L13a from the edge 1c with the first distance L11a being larger than the second distance L13a.

The first surface 1a may e.g., be a first major surface 1a of the first part 1. In the preferred embodiment, the first surface 1a is a first major surface 1a of the first part 1 facing a corresponding first surface 1a formed of a first major surface 1a of an oppositely arranged second instance of a first part 1. The second instance of the first part 1 may be an identical copy or, as typically is the case, it may be a mirrored copy; mirrored in an intermediate imaginary plane arranged between the two instances of the first part 1 and being parallel to the first major surfaces 1a.

It may be noted that the inventive joint is especially useful when the recess 10 is positioned, as seen along the first surface 1a, in a vicinity of an edge 1c of the first part 1, the edge 1c delimiting the first surface 1a, since such a positioning of the recess 10 may in the prior art designs result in that the material forming the edge 1c breaks off. The phrase "in the vicinity" refers primarily to those cases where the recess 10 is positioned so close to the edge 1c that one has to take into account that the first part 1 is weaker when the load is directed along the first surface 1a and towards the edge 1c compared to when the load is directed along the first surface 1a and away from the edge 1c. For instance, in the case of the assembled product 100 being a cupboard having side walls formed of such first parts 1 and a bottom surface formed of such a second part 2 extending between the inwardly facing major surfaces 1a of the two first parts 1, the second part 2 typically have its bottom major surface 2b essentially flush with the edges 1c, as shown e.g. in FIGS. 1 and 2 and also in FIGS. 8a-b, and the second part 2 as typically a material thickness t2 being so small that the recess 10 associated with the dowels 20 becomes located so close to the edge 1c that the first part 1 is weaker against loads towards the edge 1c compared to loads directed away from the edge 1c; i.e. such a recess 10 is considered to be in the vicinity of the edge 1c. However, if the joint is used for a central shelf being located e.g., 20 centimetres upwardly from the bottom edge 1c, there is no practical difference in the strength of the first part 1 for the case when it is being subjected to a load directed towards the bottom edge 1c compared to the case when it is being subjected to a load directed away from the bottom edge 1c. Thus, such a recess 10 is not considered to be in the vicinity of the edge 1c. In the vicinity may e.g., be defined as a distance between the edge 1c and the recess 10, with the distance being measured along a direction being transverse to the extension of the edge 1c. The recess 10 may e.g. be considered to be in the vicinity of the edge 1c if the distance e.g. is less than three times a width of the insertion portion 11 as measured in the same direction as said distance. Alternatively, or as a complementary notion, the recess 10 may e.g., be considered to be in the vicinity of the edge 1c if the distance e.g., is less than three times the depth D10 of the recess 10.

Although not necessary, the recess 10 preferably is designed such that the recess 10 physically extend along the virtual straight line E extending between a centre point 11a of the insertion portion 11 and a centre point 13a of the locking portion 13. The virtual straight line E extends in the first plane P1.

It may be mentioned that the centre point 13a of the locking portion 13 typically is a position through which a centre axis of the dowel 20 extends when the first and second parts 1, 2 are in the interlocked or interconnected position.

The first distance L11a by which the centre point 11a of the insertion portion 11 is separated from the edge 1c and second distance L13a by which the centre point 13a of the locking portion 13 is separated from the edge 1c are typically the respective closest distances as seen in the first plane P1. For an elongated straight line edge 1c these shortest distances will be measured rectilinearly to the extension of the edge 1c.

As mentioned above, the first part 1 may comprise two or more recesses 10 formed in the first surface 1a of the first part 1. The two or more recesses 10 may be positioned at a repeat distance RD from each other as seen along the edge 1c. The two or more recesses 10 may both be angled the same angle α with respect to the edge 1c, as is e.g., the case in examples of FIGS. 4 and 5. The fact that the two or more recesses 10 also are angled the same angle α it is facilitated to move the second part 2 along a translational movement allowing the dowels 20 of the second part 2 to simultaneously move from the insertion portion 11 to the locking portion 13 of the respective recess 10.

It may be noted that the two recesses 10 preferably are identical to each other, but that it is conceivable that they are slightly different from each other. However, if there are two or more recesses 10 it is at least preferred that the second recess 10, and possibly further recesses 10, is/are of the same general kind as the first recess 10 in the sense that also the second recess 10, and possibly further recesses 10, is/are defined by corresponding features as the features used to define the first recess 10, albeit possibly with different numerical values in respect of the different features.

It may be noted that in case there are three or more recesses 10 according to one embodiment the same repeat distance RD is used for all the recesses 10, as is e.g., the case in FIGS. 4 and 5, whereas according to another embodiment one repeat distance RD is used between at least a first set of two neighbouring recesses 10 and another repeat distance RD is used between at least a second set of two neighbouring recesses 10, wherein the sets of neighbouring recesses 10 may but need not share a common recess 10.

The respective centre point 11a of the respective insertion portion 11 of the two or more recesses 10, if present, are preferably both/all located the same first distance L11a from the edge 1c.

The respective centre point 13a of the respective locking portion 13 of the two or more recesses 10, if present, are preferably both/all located at the same second distance L13a from the edge 1c.

The angle α is preferably at least 5°, more preferably between 5-40°, yet more preferably between 5-30°. As mentioned above, there is provided a significant improvement already for small angles α. However, in order to provide a really significant effect the angle α is preferably at least 5°. On the other hand, if the angle α becomes too large, it may become counter-intuitive concerning the direction by which the second part 2 should be moved relative to the first part 1 in order to move the dowel 20 from the insertion portion 11 to the locking portion 13. A large angle α may also make it more difficult to design the assembled product 100 such that the recess 10 is hidden by the second part 2. This latter is not necessary, but it is often desirous to hide the recess 10 since it reduces the risk that the skin of a finger gets caught, it secures that there is no dust trap formed, and it is often desirous from an aesthetical perspective. Thus, the angle α is preferably at least 5°, more preferably between 5-40°, yet more preferably between 5-30°.

The first part 1 is preferably designed such that, along the depth D10 of the recess 10, the insertion portion 11 has a width D11, as measured across the extension E10 of the recess 10.

As e.g., shown in FIGS. 3b-e, the first part 1 is preferably designed such that, along the depth D10 of the recess 10, the locking portion 13 has at least one first portion 13-1 having a first width D13-1, as measured across the extension E10 of the recess 10, and being located at a first depth D10-1, and at least one second portion 13-2 having a second width D13-2, as measured across the extension E10 of the recess 10, and being located at a second depth D10-2. The second depth D10-2 is deeper than the first depth D10-1, and the second width D13-2 is larger than the first width D13-1. The first width D13-1 of the first portion 13-1 of the locking portion 13 is smaller than the width D11 of the insertion portion 11.

This may alternatively or complementary be referred to as that the first part 1 is preferably designed such that there is a comparably wide portion 13-2 down at the bottom of locking portion 13 of the recess 10 beneath a comparably narrower portion 13-1 located at or at least closer to the surface 1a. It may be noted that such a set of such a first portion 13-1 and such a second portion 13-2 may be repeated more than ones. In the preferred embodiment there is only one such set of first portion 13-1 and second portion 13-2. If there are a plurality of such sets of first and second portions 13-1, 13-2, the locking portion 13 may be said to be provided with a plurality of grooves and protrusions as seen along the direction of the depth D10. Such a design may e.g., be of the kind disclosed in US2014/205373A1; see e.g., FIGS. 4-11.

With such a design, a correspondingly shaped dowel 20 may be inserted into the insertion portion 11 of the recess 10 and may then be slid along the extension E10 of the recess 10 such that a wider portion of the dowel 20 becomes nested beneath the narrower portion 13-1 of the locking portion 13.

Figure 3C:
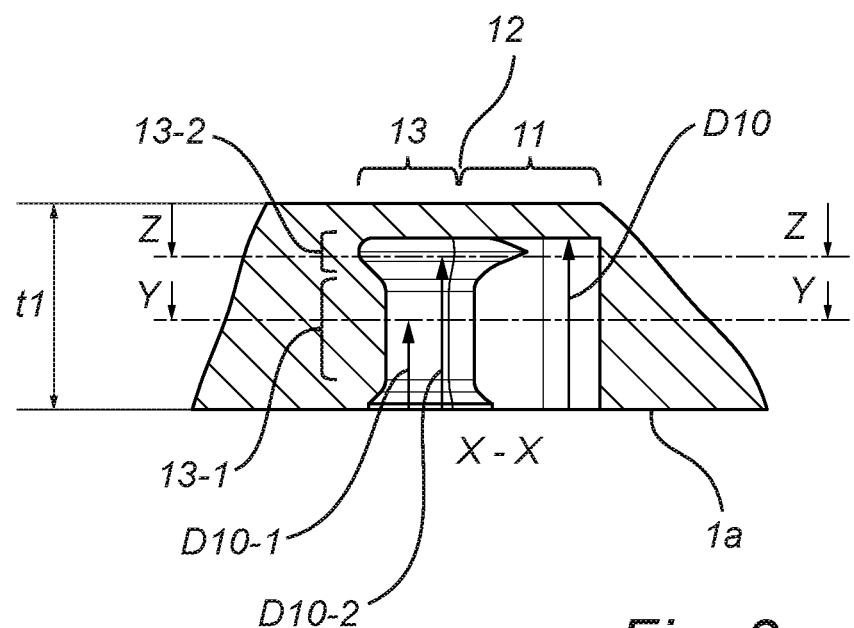
FIG. 3c is a cross-sectional view along line X-X in FIG. 3b.
Figure 3D:
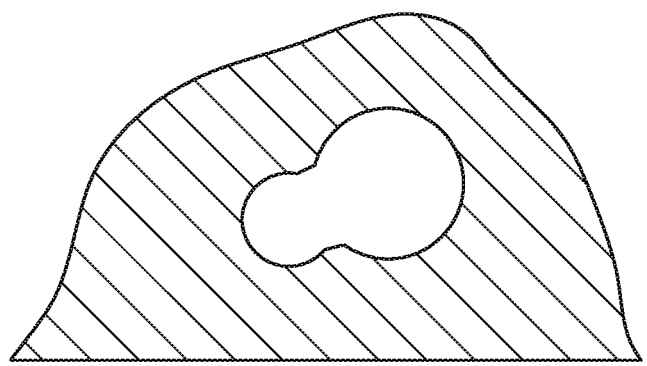
FIG. 3d is a cross-sectional view along line Y-Y in FIG. 3c.
Figure 3E:
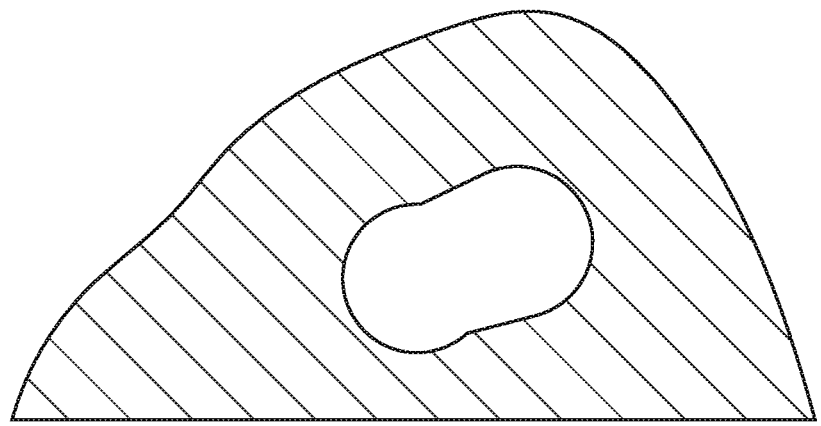
FIG. 3e is a cross-sectional view along line Z-Z in FIG. 3c.

Preferably, the second width D13-2 of the second portion 13-2 of the locking portion 13 is about equal to the width D11 of the insertion portion 11. In this context about is considered to refer to a design where the difference is less than 10%. In a preferred embodiment, the second width D13-2 of the second portion 13-2 of the locking portion 13 is nominally equal to the width D11 of the insertion portion 11. It is conceivable that the width D11 of the insertion portion 11 is slightly larger than the second width D13-2 of the second portion 13-2 of the locking portion 13 such that insertion of the dowel 11 is facilitated and a strong locking effect is provided when the dowel 20 is in the locking portion 13. This may e.g., be within the 10% difference referred to above. It may be noted that the lines marking the width D13-2 should e.g., in FIG. 4 be dashed lines since they are hidden contours, but since the recess 10 is also flared at the surface 1a, as e.g., shown in FIGS. 3a-c, to a width being about equal to the width D13-2 at the bottom 13-2, those dashed lines are in e.g., FIGS. 4-6 hidden by the solid lines indicating the flaring at the surface. The widths D13-1, D13-2 at the different depths D101, D10-2 of the locking portion 13 of the recess 10 are best shown in FIGS. 3c-e.

The recess 10 may be angled an angle α at least such that a shortest distance t11 between the insertion portion 11 and the edge 1c is equal to a shortest distance t13 between the first portion 13-1 of the locking portion 13 and the edge 1c. In FIG. 4, the angle α is such that the shortest distance t11 between the insertion portion 11 and the edge 1c is just slightly larger than the shortest distance t13 between the first portion 13-1 of the locking portion 13 and the edge 1c. In FIG. 4, the angle α is about 20°. It may be noted that in order for the shortest distance t11 between the insertion portion 11 and the edge 1c to be at least equal to the shortest distance t13 between the first portion 13-1 of the locking portion 13 and the edge 1c, the angle α necessary is also dependent upon the extension E10 of the recess 10. For a comparably longer recess 10 one may choose a smaller angle α and for a comparably short recess 10 one would choose a greater angle α to achieve the desired relationship between the distance; that the shortest distance t11 between the insertion portion 11 and the edge 1c is at least equal to the shortest distance t13 between the first portion 13-1 of the locking portion 13 and the edge 1c.

In FIG. 5, there is shown a variant in which the recess 10 is angled an angle α such that a shortest distance t11 between the insertion portion 11 and the edge 1c is shorter than a shortest distance t13 between the first portion 13-1 of the locking portion 13 and the edge 1c but greater than a shortest distance t13-2 between the second portion 13-2 of the locking portion 13 and the edge 1c. The angle α is about 10° in FIG. 5. However, as mentioned above, there is a significant improvement also for angles α as small as about 5°.

The first part 1 have a material thickness t1 at the recess 10 as measured along the normal N to the first surface 1a, and the recess 10 may have a depth D10 being between 25% and 90% of the material thickness t1 of the first part 1 at the recess 10. Preferably the recess 10 may have a depth D10 being between 50% and 90% of the material thickness t1 of the first part 1 at the recess 10.

This may alternatively be referred to as that the remaining material thickness between the bottom of the recess 10 and the second major surface 1b, opposing the first major surface 1a, is between 75% and 10%, preferably between 50% and 10%, of the material thickness t1 of the first part 1 at the areas surrounding the recess 10. This is considered to make it possible to strike a balance between providing a strong structure with a design of the recess 10 and dowel 20 such that it is capable of withstanding that the dowel 20 is pulled out of the recess 10 along the direction of the normal N and such that it reduces the risk that the edge 1c breaks off.

The assembled product 100 of the kind disclosed above is especially suitable to be transported in a non-assembled, flat-laid state in the form a kit of parts. It is especially useful for use scenarios where the kit of parts is transported in a flat-laid state to the site of use. At the site of use, such as at a home, the kit of parts may be assembled into the assembled product 100. It may be noted that some of the components may be pre-assembled. This especially true for components that may be pre-assembled without having a significant negative impact on the possibility to transport the kit of parts in a flat-laid state. The dowels 20 may e.g., be formed of separate parts being pre-assembled with the second part 2 at a manufacturing site. However, the dowels 20 may also be designed to be attached to the second part 2 at the site of use.

However, the advantages of transporting the assembled product 100 in the form of a flat-laid kit of parts may also have advantages for use scenarios where the kit of parts may be assembled into the assembled product 100 before being sold or before being delivered to the customer. Thus, the kit of parts may be transported in a flat-laid state from the manufacturing site to an intermediate site, such as a furniture store or the like, where the product is assembled.

The kit of parts for forming an assembled product 100 comprises a first part 1, and a second part 2 having a dowel 20.

The dowel 20 extends from a surface 2*c* of the second part 2 along a dowel direction E20 towards a free end 25 of the dowel 20.

As is e.g., most clearly shown in FIGS. 3*a*, 7, 8*a*-*b*, the recess 10 of the first part 1 is configured to receive the dowel 20 of the second part 2 such that the first and second parts 1, 2 become interconnected in order to form the assembled product 100.

The second part 2 has at the dowel 20 a material thickness t2 as measured along a first transverse direction T20-1 being transverse to the dowel direction E20. The second part 2 has also an extension E20-T2 in a second transverse direction T20-2 being transverse to the dowel direction E20 and to the first transverse direction T20-1. The dowel 20 is preferably positioned centrally on the end surface 2*c* of the second part 2. They are positioned centrally in the sense that the centre axis 20*a* of the respective dowel 20 is positioned on a centre line 2*c*' extending along the second transverse direction T20-2 and being located mid-way as seen along the material thickness t2. This may also be expressed as that the centre axis 20*a* of the respective dowel 20 is positioned at equal distances t2/2 from the two major surfaces 2*a*, 2*b* of the second part 2. This is e.g., shown in detail in FIG. 8*a*.

The dowels 20 are preferably formed as separate members being attached to the second part 2. The dowels 20 may be made of wood based material. The dowels 20 may be made of polymer based material. The dowels may be attached by being inserted into bores into the second part 2. The dowels 20 may be attached to the second part 2 by being provided with threads screwed into the second part 2, directly or preferably into bores formed in the second part 2. The dowels 2 may be attached to the second part 2 by wood welding. The dowels 2 may be attached to the second part 2 by gluing. Alternatively, the dowels 20 may be integrally formed with the second part 2.

The second part 2 is preferably a panel shaped member. The second part 2 has preferably a uniform thickness t2 and two opposing flat major surfaces 2*a*, 2*b*. The dowel 20 preferably extends from an end surface 2*c* of the second part 2. The end surface 2*c* has preferably a main extension along, more preferably parallel with, a direction of a normal direction to the opposing flat major surfaces 2*a*, 2*b*.

The first part 1 is preferably a panel shaped member. The first part 1 has preferably a uniform thickness t1 and two opposing flat major surfaces 1*a*, 1*b*. The recess 10 is preferably formed in one of the major surfaces 1*a*, preferably in the major surface 1*a* facing inwardly towards the interior of the assembled product.

In this context it may be noted that the major surfaces of the first part and/or of the second part may be provided with other kinds of recesses, protrusions, holes, etc. The notion panel shaped members having major surfaces refers to their general appearance. In FIG. 3*a*, it is e.g., shown that the first part 1 may be provided with a plurality of holes 18 which e.g., may be used to install additional shelfs, hooks, etc. at various heights inside the assembled product 100. Such holes 18 may also be used to attach suspension brackets 6 as shown in FIG. 1. In FIG. 3*a*, it is e.g., also shown that the first part 1 may be provided with elongated grooves 19 configured to receive a backwall panel.

Further to the discussion above concerning the angle α, the recess 10 is preferably angled an angle α at the most such that, as shown in FIG. 6, the surface 2*c*, which has an extension E20-T1 defined by the material thickness t2 in the first transverse direction T20-1 and by the extension E20-T2 of the second part 2 in the second transverse direction T20-2, fully covers the recess 10 including fully covering a mouth of the insertion portion 11 when the first and second parts 1,2 are interconnected to form the assembled product 100. In this variant shown in FIG. 6, the angle α is about 40°.

Preferably, the extension E20-T2 of the second part 2 in the second transverse direction T20-2 being transverse to the dowel direction E20 and to the first transverse direction T20-1 is larger than the material thickness t2 of the second part 2. This is preferably true at least in one direction from the respective dowel along the second transverse direction T20-2. In the preferred embodiment this extension is larger than the material thickness t2 in both directions from the respective dowel 20 along the second transverse direction T20-2. However, it is conceivable that one or both dowels 20 at the respective end as seen along the second transverse direction T20-2 is located so close to the end that the extension between that dowel 20 and the end is smaller than the material thickness t2. However, in that case, the extension from that dowel 20 is still preferably larger than the material thickness t2 in the direction along the second transverse direction T20-2 towards the neighbouring dowel 20.

Preferably, the first part 1 is configured to form a structural side wall of the assembled product, the structural side wall extending along a side wall direction having a main component along a vertical direction, and
the second part 2 is configured to form a structural shelf of the assembled product, the structural shelf extending along a shelf direction having a main component along a horizontal direction.

Preferably, the structural side wall extending along a side wall direction extends along a vertical direction. Preferably, the structural shelf extending along a shelf direction extends along a horizontal direction.

Preferably, the second part 2 is configured to form a structural bottom of the assembled product.

Figure 8B:
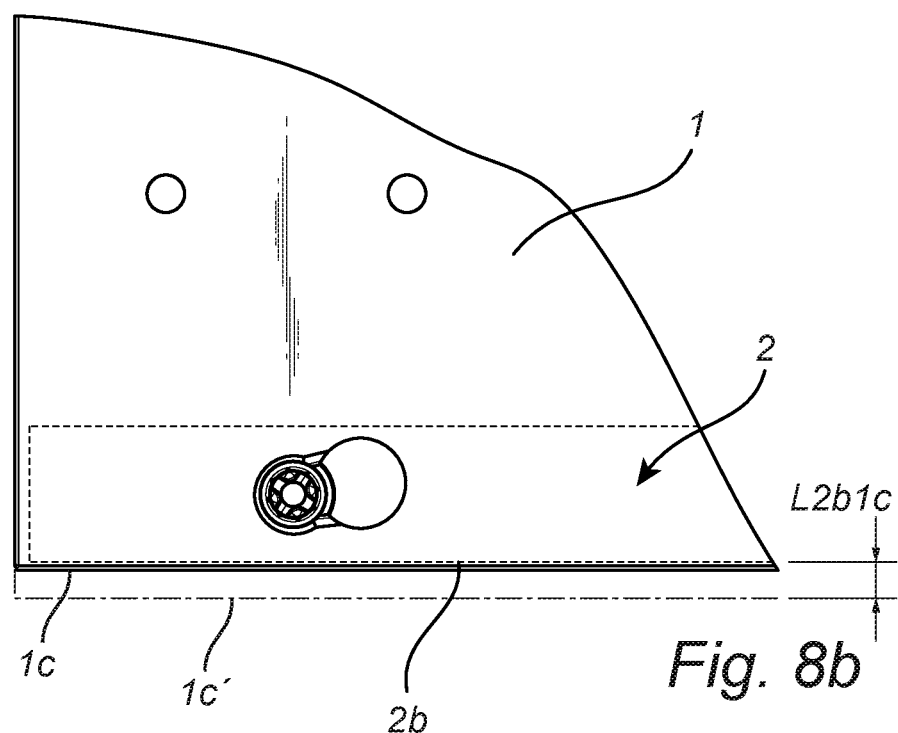

Preferably, the first and second parts 1, 2 are designed such that, when the first and second parts 1, 2 are interconnected with each other, a virtual planar extension of an outwardly facing major surface 2*b* of the second part 2 is located in flush with the edge 1*c* of the first part 1, or is positioned at a distance L2*b*1*c* extending inwardly along the first surface 1*a* from the edge 1*c*. Preferably, the distance L2*b*1*c* is less than material thickness t2 of the second part 2, more preferably less than half the material thickness t2 of the second part 2. In FIG. 8*b*, it shown that the second part 2 is located in about flush with the edge 1*c* of the first part 1.

In FIG. 8*b*, it is also indicated an alternative design where the position of the edge 1*c*' relative to the outer major surface 2*b* is such that there is formed a distance L2*b*1*c* between the edge 1*c*' and the outer major surface 2*b* of the second part 2. In such a case it is preferred that the second part 2 is positioned such that it is in a sense moved inwardly away from the edge 1*c*', or alternatively expressed, such that a narrow strip of the first surface 1*a* is exposed between the edge 1*c*' of the first part 1 and the outer major surface 2*b* of the second part 2. The distance L2*b*1*c* is preferably less than material thickness t2 of the second part 2, more preferably less than half the material thickness t2 of the second part 2.

It is also conceivable that the outer major surface 2*b* could be located outside the edge 1*c*, i.e. with the distance L2*b*1*c* extending away from the first part 1. However, this latter is typically not used since the panel shaped members 2 typically have a rough end surface 2*c*. Moreover, it would typically increase the risk that the edge 1*c* breaks off.

Preferably, the first and second parts 1, 2 are designed such that the first part 1 has a material thickness t1 at the recess 10 as measured along the normal N to the first surface 1a, and the material thickness t1 of the first part 1 is within 50% to 200%, preferably within 80% to 120%, of the material thickness t2 of the second part 2.

It is contemplated that there are numerous modifications of the embodiments described herein, which are still within the scope of the invention as defined by the appended claims.

In this context it may also be noted that the edge 1c does not necessarily need to be a straight line. The edge 1c may be shaped differently; it may e.g. be shaped as an undulating wave, as a single concave or convex curve with constant or varying radius of curvature, as a step-function, as a zig-zag-design. However, in the preferred embodiment, the edge 1c is shaped as a straight line. In this context it may also be noted that the edge 1c has in one direction a linear extension, typically a rectilinear extension but as mentioned above conceivably also along a line having any other shape, delimiting the first surface 1a and in another direction an extension extending typically parallel to, or conceivably at least with a main component along, the normal N to the first surface 1a, such that the edge 1c essentially forms an end surface 1c of the first part 1. It may in this context be noted that the end surface 1c typically extends along the complete material thickness t1 of the first part 1 and thereby forms an end surface 1c extending across the complete material thickness t1. However, the inventive joint may conceivably also be useful if the first part 1 has a stepped end surface with an edge 1c delimiting the first surface 1a where the edge 1c extends only through part of the material thickness t1 of the first part 1. The inventive joint may be useful basically for all cases where the recess 10 is formed in a first surface 1a and is positioned in the vicinity of an edge 1c delimiting the first surface 1a. It may in this context also be noted that although the extension of the edge 1c, as seen along the normal N of the first surface 1a, is typically a planar surface parallel to the normal N, the extension along the direction of the normal N may have other shapes, such as the ones referred to above with reference to the linear extension along the edge 1c.

The invention claimed is:

1. A first part, comprising:
two recesses being configured to receive a respective associated dowel of a second part, such that the first and second parts become interconnected in order to form an assembled product,
wherein the two recesses are formed in a first surface of the first part, the first surface being intended to face the second part, and wherein the recesses are positioned, as seen along the first surface, in a vicinity of an edge of the first part, the edge delimiting the first surface,
wherein the two recesses are positioned at a repeat distance from each other as seen along the edge,
wherein the recesses each has a depth, as seen along a normal to the first surface, and an extension, as seen in a first plane being parallel to the first surface, and includes an insertion portion and a locking portion arranged one after the other along the extension of the recess,
wherein the respective dowel of the second part is adapted to be inserted into the respective insertion portion by relatively moving the second part towards the first surface, and then to be transferred from the respective insertion portion to the respective locking portion by relatively moving the second part along the extension of the respective recess, and
wherein a respective virtual straight line extending between a centre point of the respective insertion portion and a centre point of the respective locking portion forms a respective angle relative to the edge of the first part as seen in the first plane by the centre point of the respective insertion portion being located at a respective first distance from the edge and the centre point of the respective locking portion being located at a respective second distance from the edge with the respective first distance being larger than the respective second distance.

2. The first part according to claim 1, wherein the two recesses are both angled at the angle with respect to the edge.

3. The first part according to claim 1, wherein the respective centre point of the respective insertion portion of the two recesses are both located at the first distance from the edge.

4. The first part according to claim 1, wherein the respective centre point of the respective locking portion of the two recesses are both located at the second distance from the edge.

5. The first part according to claim 1, wherein the angle is between 5-40°.

6. The first part according to claim 1, wherein along the depth of the respective recess,
the insertion portion has a width, as measured across the extension of the recess, and
the locking portion has
at least one first portion having a first width, as measured across the extension of the recess, and being located at a first depth, and
at least one second portion having a second width, as measured across the extension of the recess, and being located at a second depth, the second depth being deeper than the first depth, and the second width being larger than the first width,
wherein the first width of the first portion of the locking portion is smaller than the width of the insertion portion.

7. The first part according to claim 6, wherein the second width of the second portion of the locking portion is about equal to the width of the insertion portion.

8. The first part according to claim 6, wherein the respective recess is angled an angle at least such that a shortest distance between the insertion portion and the edge is equal to a shortest distance between the first portion of the locking portion and the edge.

9. The first part according to claim 1,
wherein the first part has a first material thickness at the respective recess as measured along the normal to the first surface, and
wherein the recess has a depth being between 25% and 90% of the first material thickness of the first part at the recess.

10. A kit of parts for forming an assembled product, the kit of parts comprising:
a first part according to claim 1, and
a second part having dowels extending from a surface of the second part along a dowel direction towards a free end of the respective dowel,
wherein the respective recess of the first part is configured to receive a respective associated dowel of the second part such that the first and second parts become interconnected in order to form the assembled product.

11. The kit of parts according to claim 10, wherein the first part is a first panel shaped element, and wherein the first surface, in which the recess is formed, is a major surface of the first panel shaped element.

12. The kit of parts according to claim 10, wherein the second part is a second panel shaped element, and wherein the surface, from which the dowel extends, is an end surface of the second panel shaped element.

13. The kit of parts according to claim 10, wherein the second part has at the respective dowel a second material thickness as measured along a first transverse direction being transverse to the dowel direction and an extension in a second transverse direction being transverse to the dowel direction and to the first transverse direction, and wherein the recess is angled an angle at the most such that the surface, which has an extension defined by the second material thickness in the first transverse direction and by the extension of the second part in the second transverse direction, fully covers the recess including fully covering a mouth of the insertion portion when the first and second parts are interconnected to form the assembled product.

14. The kit of parts according to claim 10, wherein the first part is configured to form a structural side wall of the assembled product, the structural side wall extending along a side wall direction having a main component along a vertical direction, and the second part is configured to form a structural shelf of the assembled product, the structural shelf extending along a shelf direction having a main component along a horizontal direction.

15. The kit of parts according to claim 10, wherein the second part is configured to form a structural bottom of the assembled product.

16. The kit of parts according to claim 10, wherein a virtual planar extension of an outwardly facing major surface of the second part is located in flush with the edge of the first part, or is positioned at a distance extending inwardly along the first surface from the edge, the distance being less than half the second material thickness of the second part.

17. The kit of parts according to claim 10, wherein the first part has a first material thickness at the respective recess as measured along the normal to the first surface, and wherein the first material thickness of the first part is within 80% to 120% of the second material thickness of the second part.

18. The kit of parts according to claim 10, the assembled product is a furniture product.

19. An assembled product, being a furniture product, formed of:

a first part according to claim 1, and a second part having dowels extending from a surface of the second part along a dowel direction towards a free end of the respective dowel, wherein the first and second parts are interconnected to each other by the respective dowel of the second part being positioned in the respective associated recess of the first part.

20. The first part according to claim 1, wherein the assembled product is a furniture product.

* * * * *